United States Patent [19]

Shimizu et al.

[11] Patent Number: 5,082,753
[45] Date of Patent: Jan. 21, 1992

[54] COOLING DEVICE FOR FUEL CELL

[75] Inventors: Hiroshi Shimizu; Yoshiaki Ozawa, both of Kawasaki, Japan

[73] Assignee: Fuji Electric Co., Ltd., Kawasaki, Japan

[21] Appl. No.: 551,828

[22] Filed: Jul. 12, 1990

[30] Foreign Application Priority Data

Jul. 19, 1989 [JP] Japan .................... 1-186956
Jan. 26, 1990 [JP] Japan .................... 2-17067

[51] Int. Cl.⁵ ............................... H01M 8/04
[52] U.S. Cl. ........................... 429/26; 165/180
[58] Field of Search .............. 429/26, 37; 165/180

[56] References Cited

U.S. PATENT DOCUMENTS 3,923,546 12/1975 Katz et al. ............. 429/26 X
3,964,929 6/1976 Geevstad ................ 429/26
4,368,448 1/1983 Kobayashi et al. ......... 165/180 X
4,706,737 11/1987 Taylor et al. ............ 429/26 X Primary Examiner—Stephen J. Kalafut
Attorney, Agent, or Firm—Armstrong, Nikaido, Marmelstein, Kubovcik & Murray

[57] ABSTRACT

Cooling pipes are embedded in cooling plates for cooling the cell stack of a fuel cell battery. Cooling water is supplied from an inlet main cooling pipe to the cooling pipes, and, after having cooling the cell stack, is discharged from an outlet main cooling pipe. Each of the inlet and outlet main cooling pipes comprises a concentric stock of short metallic pipes and ring-shaped insulating spacers, the metallic pipes and the insulating spacers being alternately arranged. The metallic pipes and insulating spacers of the concentric stock are fastened together by either studs disposed around the stack or springs housed in outer holder tube which is fitted over the concentric stock.

2 Claims, 4 Drawing Sheets

COOLING DEVICE FOR FUEL CELL

BACKGROUND OF THE INVENTION

1. Field of the Invention

The present invention relates to a device for cooling a fuel cell comprising a stack of unit cells with a cooling medium which is supplied from an external source and passes through cooling pipes disposed in cooling plates that are distributed in the cell stack.

2. Description of the Prior Art

One known cooling arrangement for cooling a fuel cell is disclosed in Japanese Laid-Open Patent Publication No. 61(1986)-147467, for example. The disclosed cooling arrangement includes cooling plates disposed in a stack of unit cells at spaced intervals each corresponding to several cells. An electrically nonconductive cooling medium (pure water) which is supplied from an external source passes through cooling pipes embedded in the respective cooling plates to remove reaction heat from the cell stack.

FIG. 5 of the accompanying drawings shows a cooling system incorporating such a known cooling arrangement for cooling a fuel cell. The fuel cell comrises stack 1 of unit cells and cooling plates disposed in the cell stack 1 at spaced intervals each corressponding to several cells. The cooling system includes metallic cooling pipes 2a embedded in the cooling plates 2. The cooling pipes 2a have inlet and outlet ends coupled through header pipes 3 to inlet and outlet main cooling pipes 4. Each of the cooling plates 2, which serve as conductive paths between the cells, is made of a material which is electrically conductive and has a high heat transfer rate. The cooling system also includes a cooling water circulating circuit 7 connected between the inlet and outlet main cooling pipes 4, the cooling water circulating circuit 7 having a circulating pump 5 and a vapor-liquid separator 6. To the vapor-liquid separator 6, there are connected a vapor recovery pipe 7a and a cooling water replenishing pipe 7b. The fuel cell is stored in a container 8.

When the fuel cell is in operation, the circulating pump 5 is oparated to supply cooling water (pure water) 9 stored in the vapor-liquid separator 6 from the inlet main cooling pipe 4 through the header pipes 3 to the cooling pipes 2a in the cooling plates 2, thereby removing reaction heat generated in the cell stack 1. The cooling water 9 is kept at a temperature of about 180° C. under a pressure of about 10 kg/cm² in order to maintain the fuel cell at a operating temperature. Specifically, a portion of the cooling water is vaporized, and the latent heat generated when it is vaporized is employed to cool the cell stack 1.

As the fuel cell generates electricity, a potential difference is developed between adjacent two of the cooling plates 2 distributed in the cell stack 1. If the cooling pipes 2a were directly connected to the common main cooling pipes 4, then a short circuit having electrically conductive paths composed of the metallic pipes would be established across the cell stack 1. Heretofore, as shown in FIG. 6, insulating hoses 10 are connected between branch pipes 4a extending from the main cooling pipes 4 and the header pipes 3, so that potential differeces will be maintained between the cooling plates 2 and the main cooling pipes 4 which are grounded and hence at zero potential.

In FIG. 6, the cooling plates 2 in the cell stack 1 and the main cooling pipes 4 are electrically insulated by the insulating hoses 10 connected between the header pipes 3 and the branch pipes 4a with respect to each of the cooling plates 2. However the arrangement shown in FIG. 6 has the following maintenance problems:

As described above, the cooling water flowing through the cooling system is kept at a high temperature of about 180° C. under a high pressure of about 10 kg/cm². Terefore, the insulating hoses 10 connected to the pipes of the cooling system are required to be heat-resistant and pressure-resistant, as well as electically insulative, so that they can withstand the severe conditions in which they are used. It has been customary to construct the insulating hoses 10 of an electric insulating material such as fluoroplastlics and reinforce the hoses with outer pipes made of woven metallic wires. In order to prevent the high pressure cooling water from leaking from the insulating hoses 10, joint fittings capable of withstanding high pressure are attached to the opposite ends of each of the insulating hoses 10.

The insulating hoses of such a construction are however expensive to manufacture. Experience in long-term operaion of fuel cell indicates that the insulating hoses have a relatively short service life and often suffer degraded insulation and cause water leakage. The cooling system should therefore be kept in good condition through periodic replacement of the insulating hoses. However, the cost required by such periodic hose replacement is not negligible. Tere is a demand for certain measures which will solve this problem, as well as the reliability problem.

SUMMARY OF THE INVENTION

In view of the aforesaid problems of the conventional fuel cell cooling systems, it is an object of the present invention to provide a device for cooling a fuel cell by supplying a cooling medium from a main cooling pipe to cooling plates in a cell stack while maintaining electric insulation between the cooling plates, the device having an improved main cooling pipe and being free of any insulating hoses which have cost and reliability problems.

According to the present invention, a cooling device for cooling a fuel cell includes a main cooling pipe comprising a concentric slack of short metallic pipes and ring-shaped insulating spacers, the metallic pipes and the insulating spacers being alternately arranged. The metallic pipes and insulating spacers of the concentric are fastened together by studs disposed around the stack, thus making the main cooling pipe liquid-tight. Branch pipes leading to cooling plates in the fuel cell are connected to the metallic pipes.

Instead of the studs, an outer holder tube may be fitted over the pile, and springs may be housed in the outer holder tube for fastening the metallic pipes and insulating spacers together, thus making the main cooling pipe liquid-tight.

The short metallic pipes of the main cooling pipe are electrically insulated from each other by the insulating spacers. The metallic pipes correspond respectively to the cooling plates and are coupled to the cooling plates without any insulating hoses interposed therebetween. The cell stack of the fuel cell is threrefore prevented from being shorted out while the fuel cell is in operation.

The outer holder tube fitted over the concentric is effective in preventing the metallic pipes and the insulating spacers from being relatively displaced in position due to the pressure of cooling water flowing through the main cooling pipe, different thermal expansions caused by heating cycles, and creeping.

The outer holder tube has a slot defined in a circumferential wall thereof out of physical interference with branch pipes extending outwardly from the metallic pipes, but may be composed of two tube halves with a slot left therebetween. The outer holder tube is electrically insulated from the main cooling pipe by an insulating sheet interposed between the inner circumferential surface of the outer holder tube and the outer circumferential surface of the main cooling pipe.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMEMTS

Figure 1:
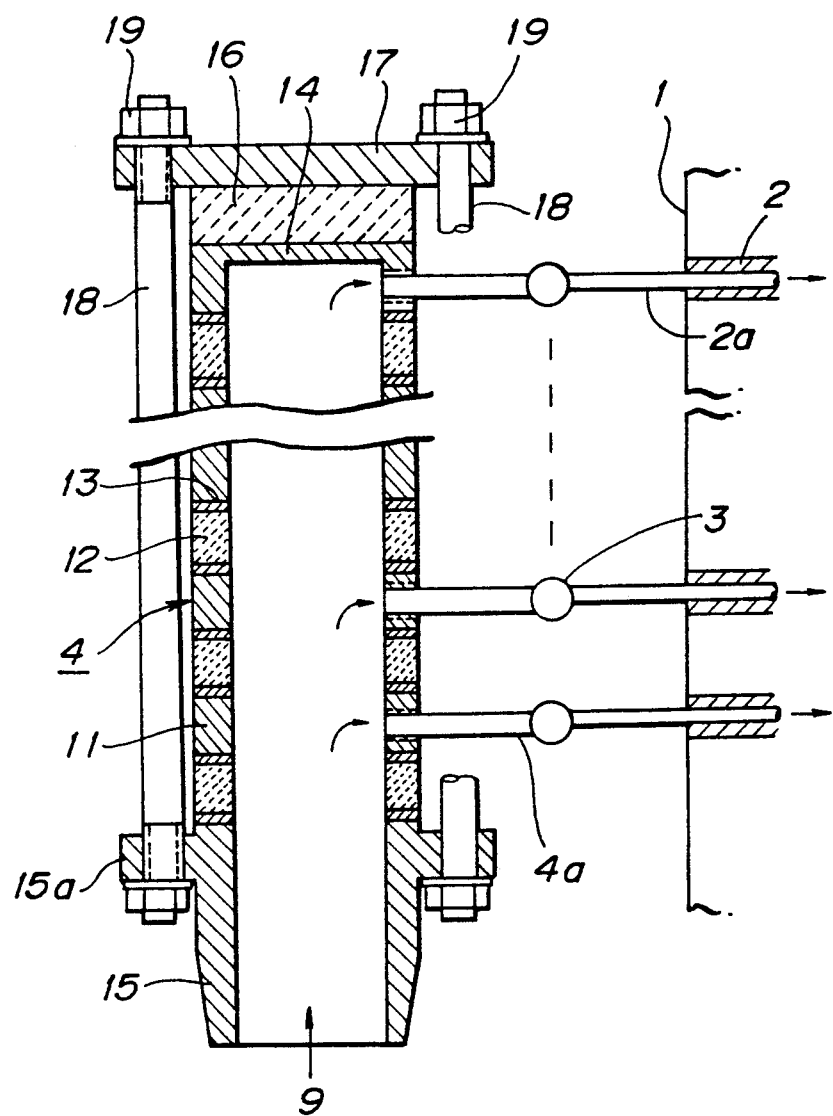
FIG. 1 is a fragmentary cross-sectional view of a cooling device according to an embodiment of the present invention.

FIG. 1 shows a cooling device according to an embodiment of the present invention. The cooling device shown in FIG. 1 is incorporated in a cooling system which is basically the same as the cooling system shown in FIG. 5 with similar elements in all the figures being marked with the same reference numerals.

The cooling device shown in FIG. 1 includes a main cooling pipe 4 which comprises a concentric stack of short metallic pipes 11 and ring-shaped insulating spacers 12, the pipes 11 and the spacers 12 being alternately arranged. The pipes 11 are connected to respective branch pipes 4a which are connected through header pipes 3 to cooling pipes 2a embedded in cooling plates 2 disposed in a cell stack 1. Sealing gaskets 13 are interposed between the metallic pipes 11 and the insulating spacers 12. The uppermost one of the pipes 11 in the concentric stack is closed by an end plate 14. The lower end of the concentric stack is joined to an inlet fitting 15 for receiving cooling water. An upper stud receiver 17 is mounted on the upper surface of the end plate 14 with an insulating plate 16 interposed therebetween. Studs 18 extend through the upper stud receiver 17 and a flange 15a of the inlet fitting 15. Nuts 19 are threaded over the upper and lower ends of the studs 18 to fasten the concentric stack together vertically, thus completing the liquid-tight main cooling pipe 4. The metallic pipes 11 correspond respectively to the cooling plates 1 in the cell stack 1. Branch pipes 4a of the main cooling pipe 4 which extend laterally from the respective pipes 11 are directly coupled to the header pipes 3 which are connected to the respective cooling pipes 2a in the cooling plates 2.

The metallic pipes 11, to which the same potential as the cooling plates 2 in the cell stack 1 is applied, are electrically insulated from each other by the insulating spacers 12. Therefore, even with the main cooling pipe 4 being directly connected to the cooling plates 2 without any insulating hoses therebetween, the unit cells of the cell stack 1 are not shorted out by the main cooling pipe 4 while the fuel cell is in operation. Cooling water is supplied from the main cooling pipe 4 to the cooling plates 2 through the branch pipes 4a, the header pipes 3, and the cooling pipes 2a. The main cooling pipe 4 is structurally rugged and durable. The results of an operation test conducted on the main cooling pipe 4 over a long period of time indicated that the main cooling pipe caused no water leakage and suffered no degraded insulation.

Figure 5:
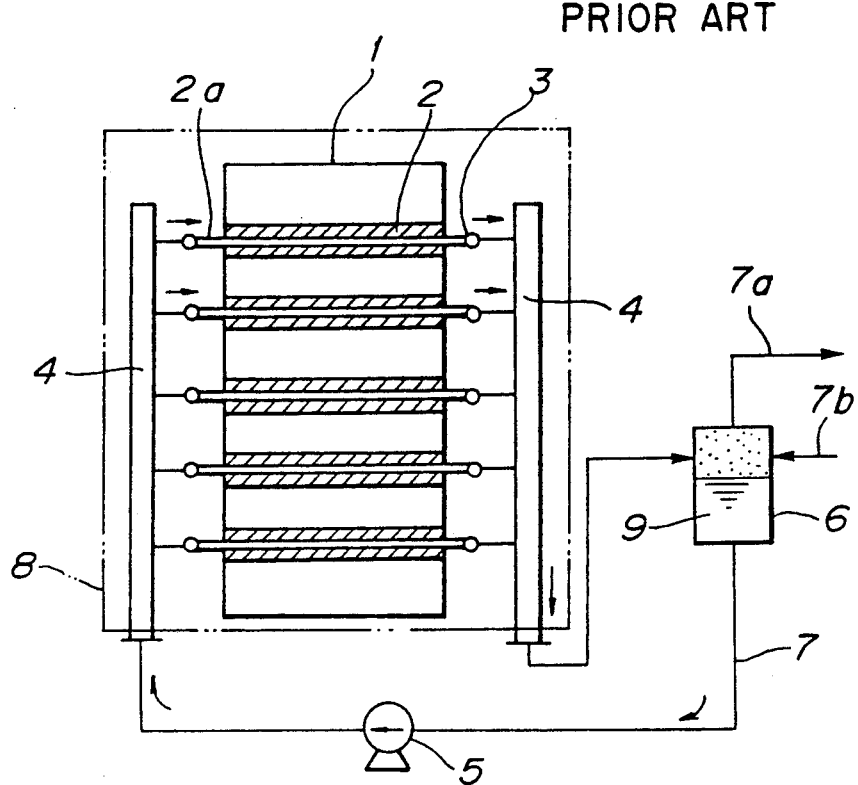
FIG. 5 is a diagram showing a cooling system incorporating a cooling device.
Figure 6:
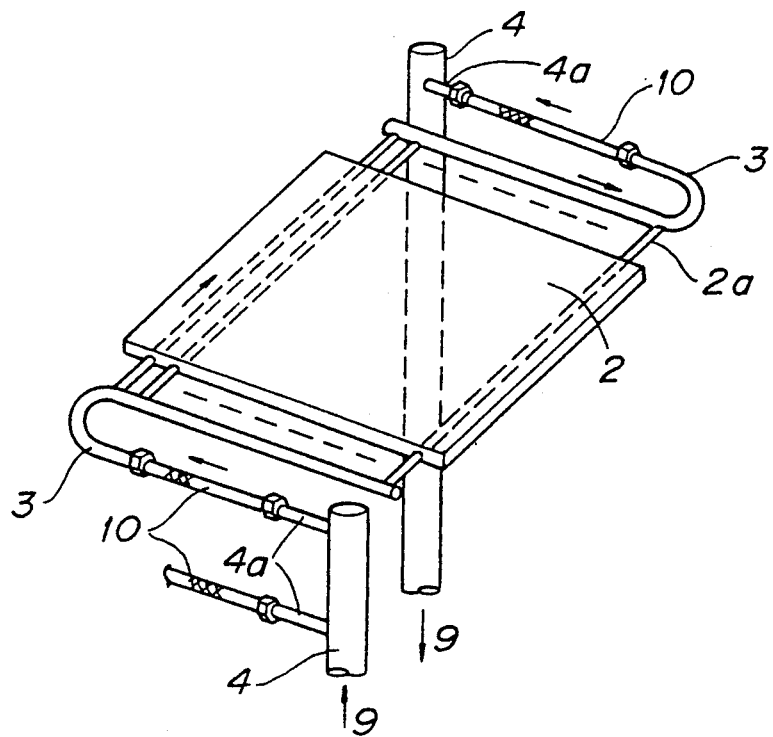
FIG. 6 is a fragmentary perspective view of a piping arrangement of a conventional cooling device.

The main cooling pipe 4 shown in FIG. 1 corresponds to the inlet main cooling pipe in the cooling system shown in FIG. 5. The outlet main cooling pipe in the cooling system shown in FIG. 5 may be identical in structure to the main cooling pipe 4 shown in FIG. 1.

Figure 2:
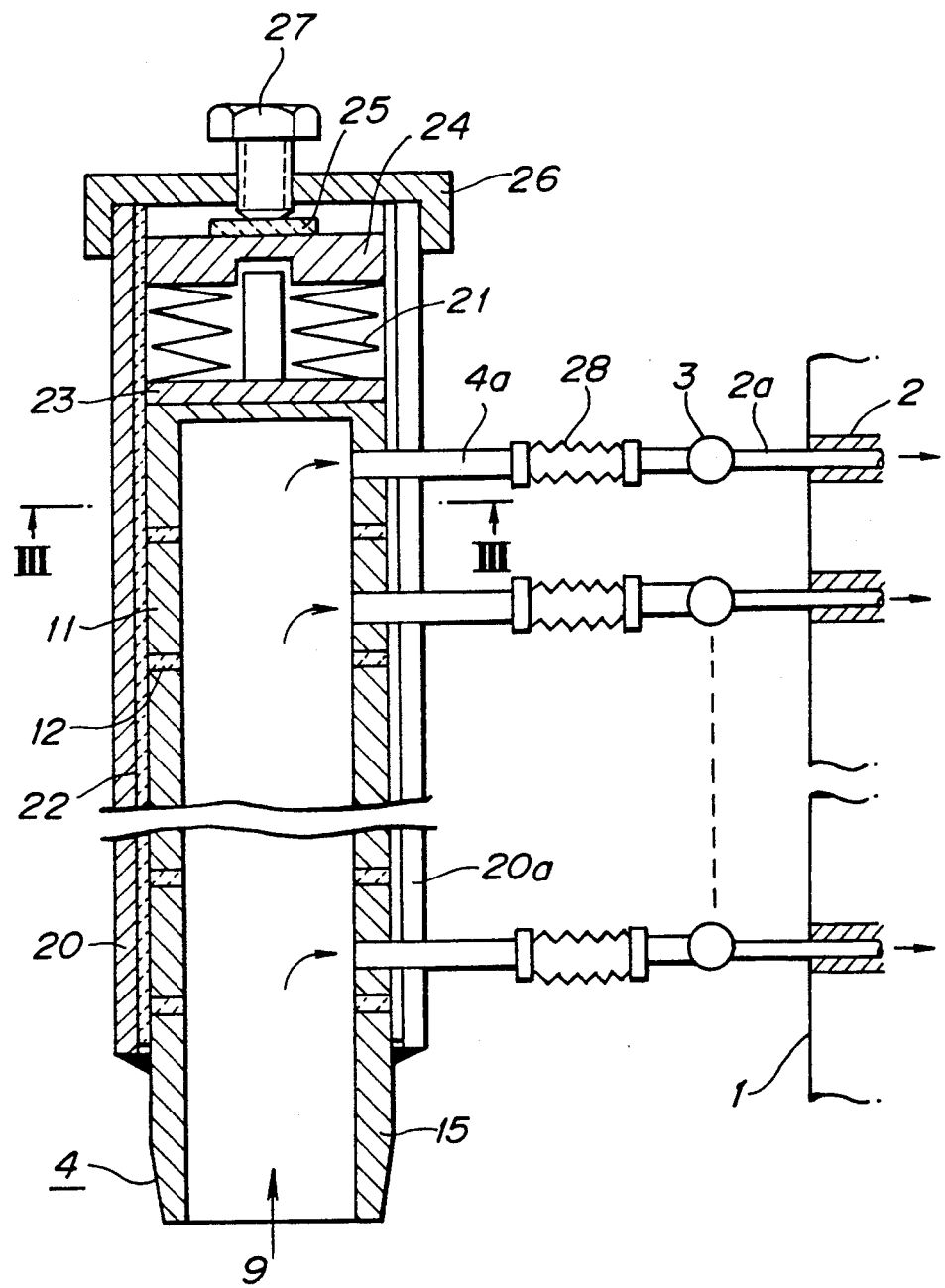
FIG. 2 is a fragmentary cross-sectional view of a cooling device according to another embodiment of the present invention.
Figure 3:
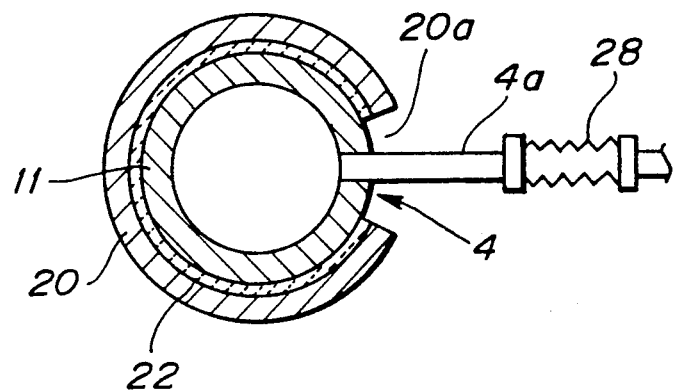
FIG. 3 is a cross-sectional view taken along line III-—III of FIG. 2.

FIGS. 2 and 3 show a cooling device according to another embodiment of the present invention. The cooling device shown in FIGS. 2 and 3 includes a main cooling pipe 4 which comprises a pile of short metallic pipes 11 and insulating spacers 12, with a fitting 15 on the lower end of the concentric stack, as with the main cooling pipe 4 shown in FIG. 1. A metallic outer holder tube 20 is fitted over the concentric stack together.

As shown in FIG. 3, the outer holder tube 20 has a slot 20a defined longitudinally therein out of physical interference with the branch pipes 4a connected to the pipes 11. The branch pipes 4a extend laterally from the pipes 11 through the slot 20a. An insulating sheet 22 is interposed between the inner circumferential surface of the outer holder tube 20 and the outer circumferential surface of the main cooling pipe 4. The outer holder tube 20 has a lower end welded or otherwise joined to the circumferential surface of the fitting 15. The Belleville springs 21 housed in the outer holder tube 20 are fitted over a spring seat 23 placed on the upper end surface of the main cooling pipe 4. The Belleville springs 21 ar held under compression by a fastening bolt 27 which is threaded through an upper end plate 26 of the outer holder tube 20 and has a tip end held against a spring presser 24 thorugh an insulating plate 25. The pile of the main coolling pipe 4 is thus held together under the bias of Belleville spring 21.

The main cooling pipe 4 shown in FIGS. 2 and 3 is also rendered liquid-tight as with the main cooling pipe 4 shown in FIG. 1. Since the outer holder tube 20 is fitted over the pile of the main cooling pipe 4, the pipes 11 and the insulating spacers 12 are reliably be prevented from being displaced due to an external pressure, heat cycles, and creeping. When the main cooling pipe 4 is assembled, the pipes 11 and the insulating spacers 12 can easily be piled togeter while being guided by the outer holder tube 20. As a result, the main cooling pipe 4 can easily be assembled. Inasmuch as the concentric stack of the main cooling pipe 4 is fastened together under the pressure from the Belleville springs 21 housed in the outer holder tube 20, the space occupied by the main cooling pipe 4 shown in FIGS. 2 and 3 is smaller than the space occupied by the main cooling pipe 4 shown in FIG. 1 in which the concentric stack is fastened togeter by the studs around the concentric stack.

The pile shown in FIGS. 2 and 3 is also fastened togeter under constant pressure.

Figure 4:
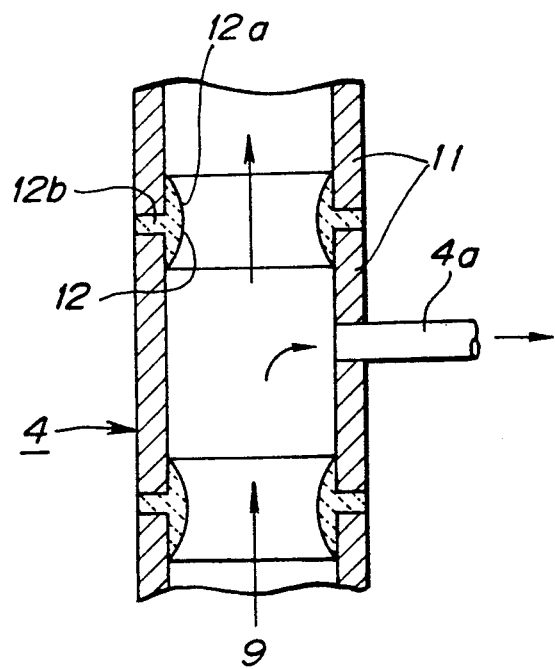
FIG. 4 is a fragmentary cross-sectional view of a modified main cooling pipe.

FIG. 4 shows a modified main cooling pipe 4 in accordance with the present invention. The modified main cooling pipe comprises a pile of metallic pipes 11 and insulating spacers 12. Each of the insulating spacers 12 has an inner tube 12a with beveled inner edges and a flange 12b extending radially outwardly from the inner tube 12a. The flange 12b is sandwiched between abjacent two of the pipes 11. The insulating distance betwwen the pipes 11 along the inner surface of each insulating spacer 12 is increased by the inner tube 12a. The inner tube 12a also serves to stiffen the pile against displacement because the inner tube 12a is pressed against the inner circumferential surfaces of the pipes 11 under the pressuer of cooling water flowing through the main cooling pipe 4.

The outer holder tube 20 is not limited to the slotted construction shown in FIG. 2 with the slot 20a defined in its circumferential wall, but may be composed of two tube halves put togeter, with a slot left therebetween. In the embodiment shown in FIG. 2, metallic flexible pipes 28 are connected between the branch pipes 4a extending from the main cooling pipe 4 and the header pipes 3 joined to the cooling plates 2. The metallic flexible pipes 28 can absorb relative positional displacemants between the cooling plates 2 in the cell stack 1 and the metallic pipes 11 in the main cooling pipe 4, so that the piping system between the cell stack 1 and the main cooling pipe 4 is not subject to undue stresses.

The cooling devices for fuel cells according to the present invention offer the fllowing advantages:

(1) The main cooling pipe itself is composed of a concentric stack of short metallic pipes and insulating spacers, which are alternately arranged, and branch pipes leading to cooling plates in a cell stack are connected to the metallic pipes. The cooling device does not have any insulating hoses which would otherwise be connected between the main cooling pipe and the cooling plates as with the conventional cooling devices. The cooling plates, between which potentials are developed in operation, are electrically insulated by the insulating spacers in the main cooling pipe, so that the cell stack is prevented from being shorted out. A cooling medium can be supplied from the common main cooling pipe to the cooling plates. The main cooling pipe is structurally rugged, and less expensive and more durable than the insulating hoses in the conventional cooling devices. The cooling device of the present invention is of increased reliability.

(2) The outer holder tube fitted over the concentric stack of metallic pipes and insulating spacers is effective to prevent the concentric stack from being displaced due to the pressure of a cooling medium, heat cycles, and creeping. The main cooling pipe is therefore highly reliable in operation.

Although certain preferred embodiments have been shown and described, it should be understood that many changes and modifications may be made therein without departing from the scope of the appended claims.

What is claimed is:

1. A device for cooling a fuel cell including a cell stack and cooling plates disposed therein and having cooling pipes disposed in the cooling plates, with a cooling medium flowing through the cooling pipes, said device comprising:
   main cooling pipes connected respectively to inlet and outlet ends of the cooling pipes through header pipes;
   each of said main cooling pipes having a concentric stack of short metallic pipes and ring-shaped insulating spacers, said metallic pipes and said insulating spacers being alternately arranged;
   studs fastening the stack of metallic pipes and insulating spacers of each said main cooling pipe together, thereby making said main cooling pipes liquid-tight; and
   branch pipes connected to said metallic pipes and leading to the cooling plates.

2. A device for cooling a fuel cell including a cell stack and cooling plates disposed therein and having cooling pipes disposed in the cooling plates, with a cooling medium flowing through the cooling pipes, said device comprising:
   main cooling pipes connected respectively to inlet and outlet ends of the cooling pipes through header pipes;
   each of said main cooling pipes having a concentric stack of short metallic pipes and ring-shaped insulating spacers, said metallic pipes and said insulating spacers being alternately arranged;
   an outer holder tube fitted over the stack of each said main cooling pipe;
   a spring house in said outer holder tube, for fastening the stack of each said main cooling pipe together, thereby making said main cooling pipes liquid-tight; and
   branch pipes connected to said metallic pipes and leading to the cooling plates.

* * * * *